(12) United States Patent
Hernandez

(10) Patent No.: US 12,571,986 B2
(45) Date of Patent: Mar. 10, 2026

(54) HELIOSTAT

(71) Applicant: Jorge Simon Hernandez, Albuquerque, NM (US)

(72) Inventor: Jorge Simon Hernandez, Albuquerque, NM (US)

( * ) Notice: Subject to any disclaimer, the term of this patent is extended or adjusted under 35 U.S.C. 154(b) by 300 days.

(21) Appl. No.: 18/367,800

(22) Filed: Sep. 13, 2023

(65) Prior Publication Data

US 2024/0094500 A1 Mar. 21, 2024

Related U.S. Application Data

(60) Provisional application No. 63/407,094, filed on Sep. 15, 2022.

(51) Int. Cl.
| | |
|---|---|
| *G02B 7/183* | (2021.01) |
| *F24S 23/71* | (2018.01) |
| *G02B 5/20* | (2006.01) |
| *G02B 7/198* | (2021.01) |

(52) U.S. Cl.
CPC .............. *G02B 7/183* (2013.01); *F24S 23/71* (2018.05); *G02B 5/208* (2013.01); *G02B 7/198* (2013.01)

(58) Field of Classification Search
None
See application file for complete search history.

(56) References Cited

U.S. PATENT DOCUMENTS

| | | | | |
|---|---|---|---|---|
| 5,930,055 A | * | 7/1999 | Eisenberg | G02B 17/0808 359/728 |
| 6,639,717 B2 | * | 10/2003 | Sugiyama | G02B 17/0694 359/359 |
| 6,667,831 B2 | * | 12/2003 | Draganov | G02B 17/061 359/399 |
| 7,843,650 B1 | * | 11/2010 | Roberts | G02B 17/0808 359/744 |
| 8,965,193 B1 | * | 2/2015 | Svec | G02B 17/0808 359/731 |
| 9,864,111 B2 | * | 1/2018 | Ohno | G02B 19/0028 |
| 2013/0329283 A1 | * | 12/2013 | Nakano | G02B 17/084 359/731 |
| 2020/0110255 A1 | * | 4/2020 | Bauman | G02B 17/0808 |

* cited by examiner

*Primary Examiner* — Robert E. Tallman
(74) *Attorney, Agent, or Firm* — Wilcox & Myers, P.C.; Jeffrey D. Myers

(57) ABSTRACT

A method and apparatus for collecting radiation by reflecting, redirecting, focusing, and transitioning the radiation, comprising providing a first reflective focusing surface, receiving full-spectrum light with the first surface, focusing the light onto a second reflective focusing surface after passing through a filtering surface, and allowing the two reflective surfaces to reflect visible light from one surface to the other and out an exit, while infrared light is minimized via the filtering surface.

6 Claims, 9 Drawing Sheets

11

HELIOSTAT

CROSS-REFERENCE TO RELATED APPLICATIONS

This application claims priority to and the benefit of the filing of U.S. Provisional Patent Application Ser. No. 63/407,094, filed on Sep. 15, 2022, and the specifications and claims thereof are incorporated herein by reference.

STATEMENT REGARDING FEDERALLY SPONSORED RESEARCH OR DEVELOPMENT

Not Applicable.

NAMES OF PARTIES TO JOINT RESEARCH AGREEMENT

Not Applicable.

REFERENCE TO A SEQUENCE LISTING, A TABLE, OR A COMPUTER PROGRAM LISTING COMPACT DISC APPENDIX

Not Applicable.

STATEMENT REGARDING PRIOR DISCLOSURES BY THE INVENTOR OR A JOINT INVENTOR

Not Applicable.

BACKGROUND OF THE INVENTION

Field of the Invention (Technical Field)

The present invention relates to a method and apparatus for collecting by reflecting, redirecting, focusing, and transitioning radiation.

Description of Related Art

Collecting the sun's radiation is an ancient art, with the device often referred to as a heliostat. The art of collecting the sun's energy is ancient, present, and future, and so, in fact, timeless. In one form or another, humanity depends on the sun's output. From the coal we burn to the food we eat, maximizing collection, photon to electron excitation, storage and transportation of this energy is imperative.

The current state of the art concerning heliostats includes passive collectors and active (movable) heliostats. Tracking the sun increases the total radiation collected over time by materializing constant flux through mechanical/physical movement of the collector/concentrator, so then flux is only a result of cloud coverage or solar radiation obstruction. Solar collection costs have therefore become a function of area coverage and mechanical/physical movement and the mechanisms associated with tracking the moving sun.

The mechanical/physical movement of a collector is dependent upon such engineering factors as wind, load, and weight, and the costs associated with building for each. One large collector can be used with associated systems for tracking, or one can employ smaller collectors and their associated tracking systems.

When considering moving/active systems maintenance, costs to repair/replace must be factored in. Outdoor heliostats, because of their purpose, are subject to extreme heat and weather conditions, so one must consider wear and breakage leading to repair/replacement.

A solution is needed that will collect radiation with as few moving parts and wind shear bracing as necessary while maximizing collection area.

BRIEF SUMMARY OF THE INVENTION

Further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a heliostatic method and apparatus to maximize solar collection area and to minimize moving parts, thereby reducing maintenance and material costs. This apparatus and method can be both passive with no moving parts or can be built with a tracking system, preferably uniaxial but optionally biaxial.

Figure 1:
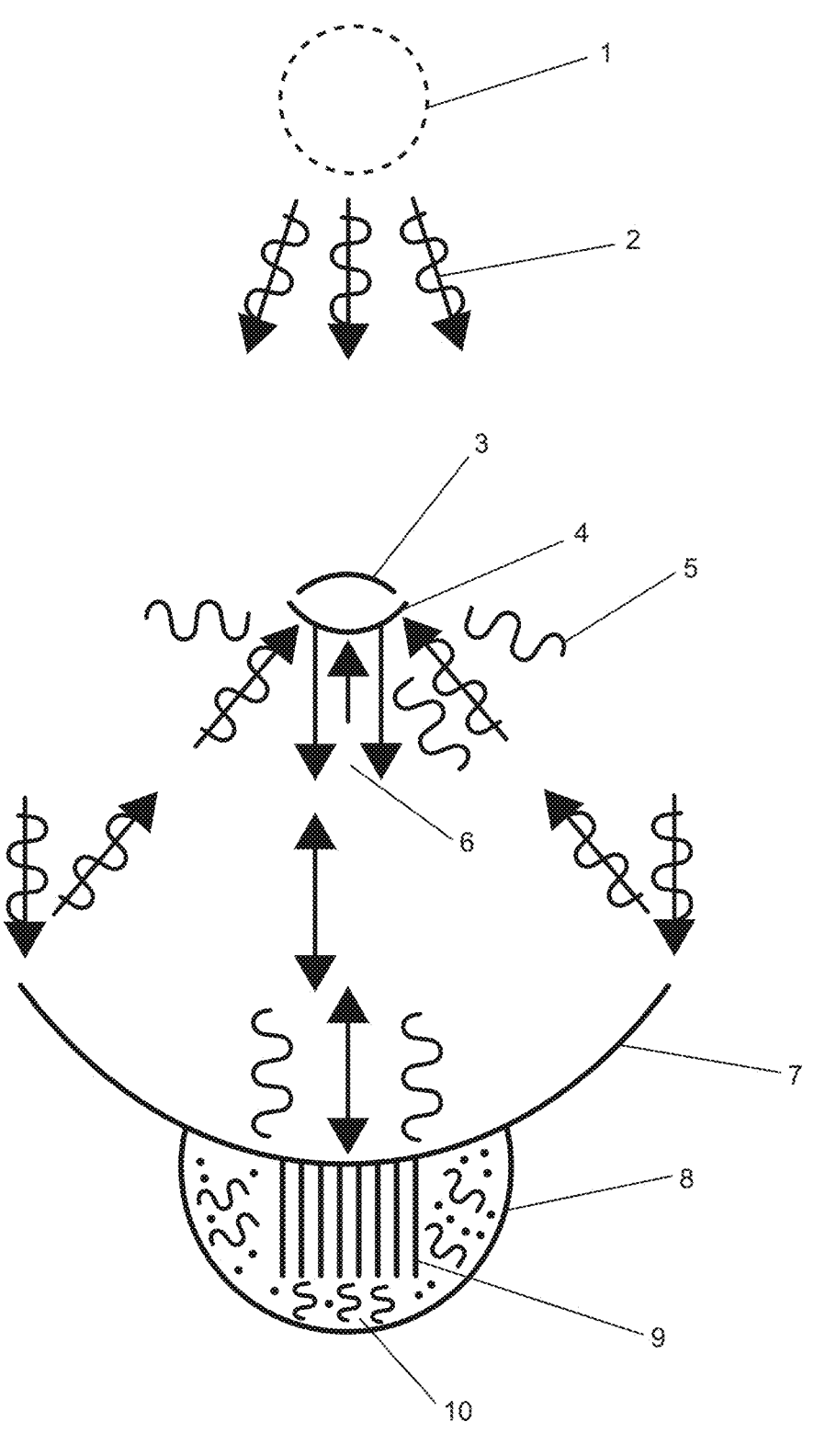
FIG. 1 is end cross-sectional view of the heliostat of the invention.
Figure 5:
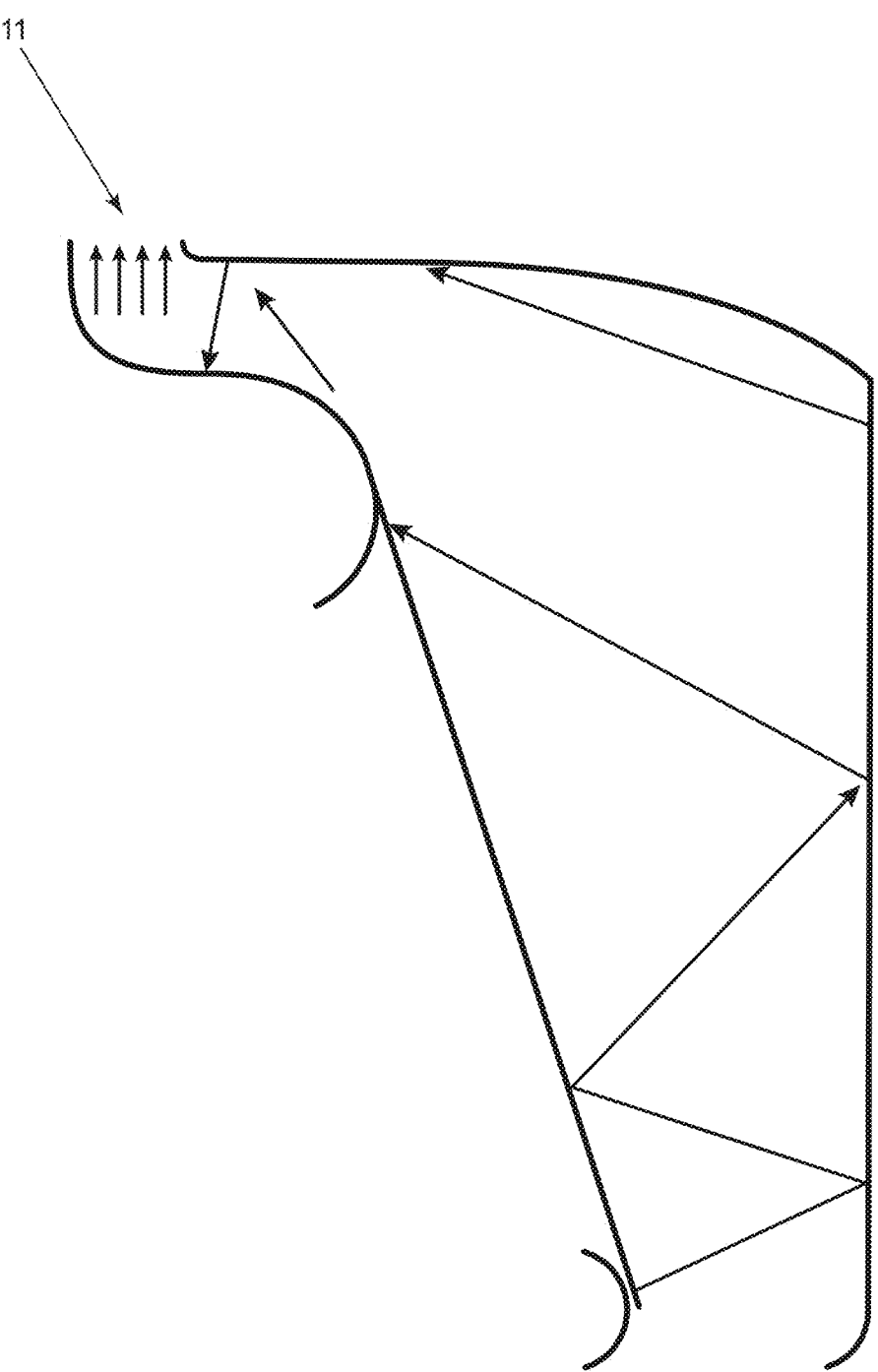
FIG. 5 is a side schematic view illustrating the two reflective surfaces working together to reflect and focus light received to an exit.

An embodiment of the invention is shown in FIG. 1, comprising a first reflective focusing surface 7 (preferably concave), which receives full-spectrum light 2 from a star 1 (e.g., the Sun). The first surface focuses the light onto second reflective focusing surface 3 (also preferably concave) after passing through filtering surface 4 (preferably convex). The two reflective surfaces are arranged such that visible light 6 continues to reflect from one to the other and out an exit 11, as shown in FIG. 5, while infrared light 5 is minimized via the filtering surface.

The invention can additionally comprise a heating/cooling containment vessel 8, a thermal exchange surface area 9, and a heating/cooling exchange media/fluid 10.

Figure 2:
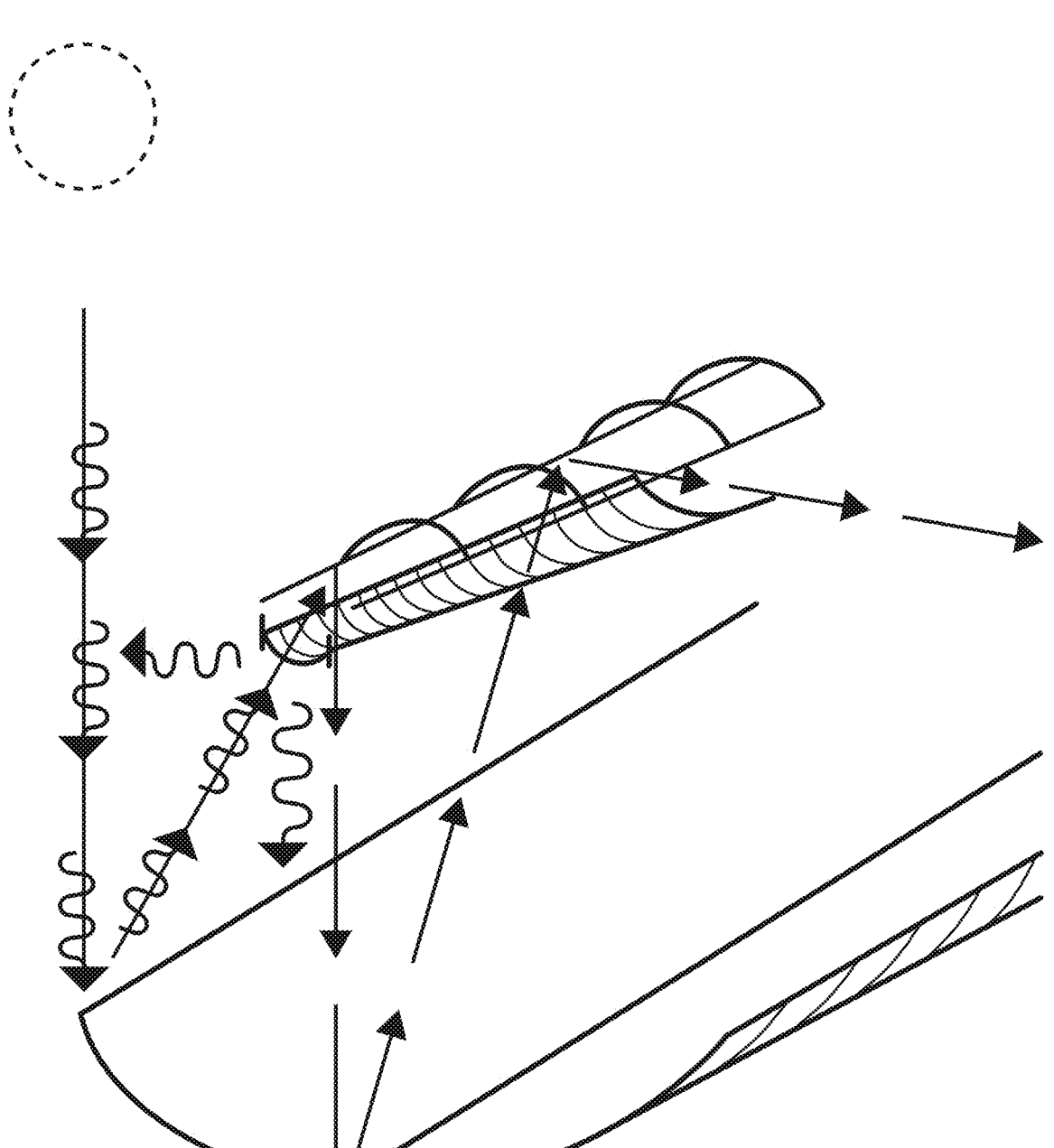
FIG. 2 is a top perspective view of the invention.
Figure 3:
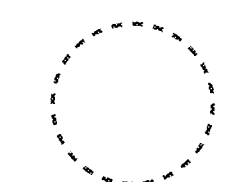
FIG. 3 is a schematic view of the light focusing and reflecting components of the invention.
Figure 3:
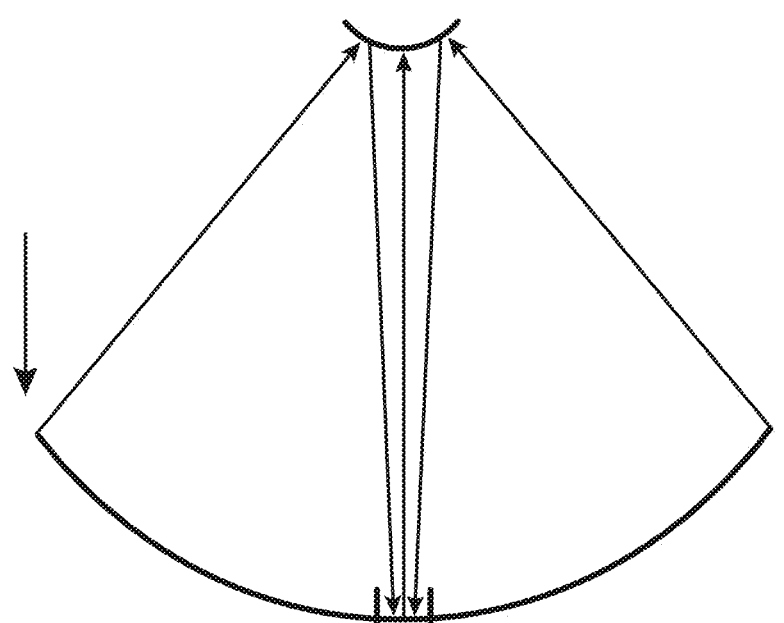
Figure 4:
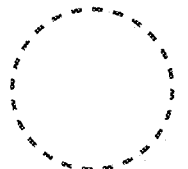
FIG. 4 is a schematic view of the invention illustrating a preferred tilt to the filtering surface with respect to the first reflective focusing surface.
Figure 4:
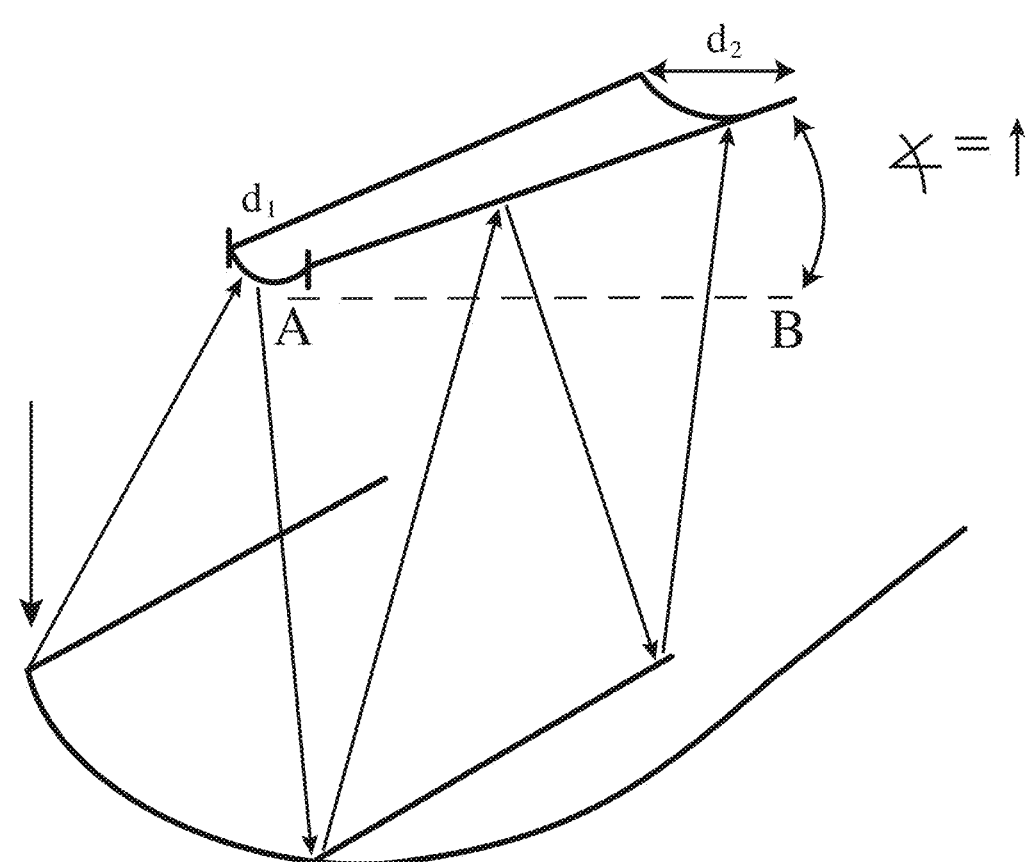
Figure 6:
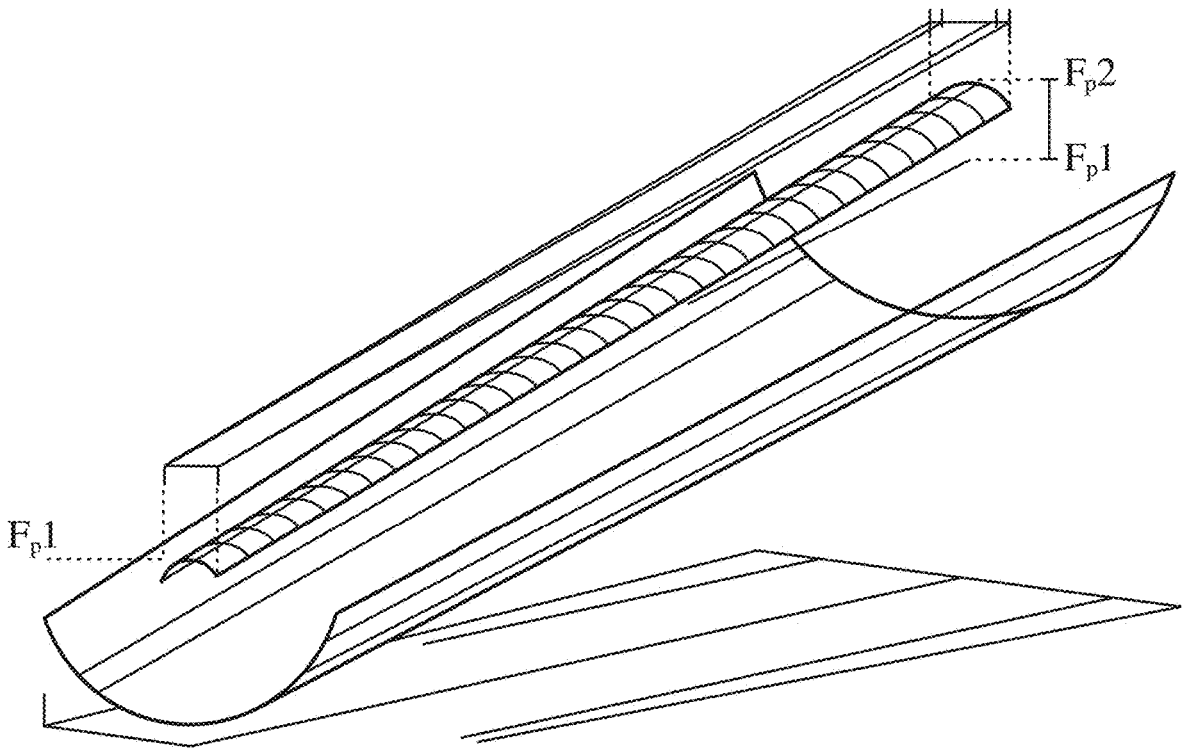
FIG. 6 illustrates an embodiment of the invention in which the two reflective surfaces are concave, with the concavities facing each other, but with no filtering surface.

FIGS. 2 and 3 illustrate the separation of the full spectrum light into visible and infrared components, and the reflection of the visible light down the apparatus. FIGS. 4 and 6 illustrate the preferred tilting of the second reflective surface with respect to the first reflective surface (diverging mirrored planes), alternatively gradually increasing. This is what allows the visible light to be steered down the apparatus, preferably to an exit as shown in FIG. 5. For most purposes, the preferred angle from parallel is between 0° and 90°. This preferably also involves a gradual increase in the focal length of the first reflective surface, as shown in FIG. 6.

Figure 7:
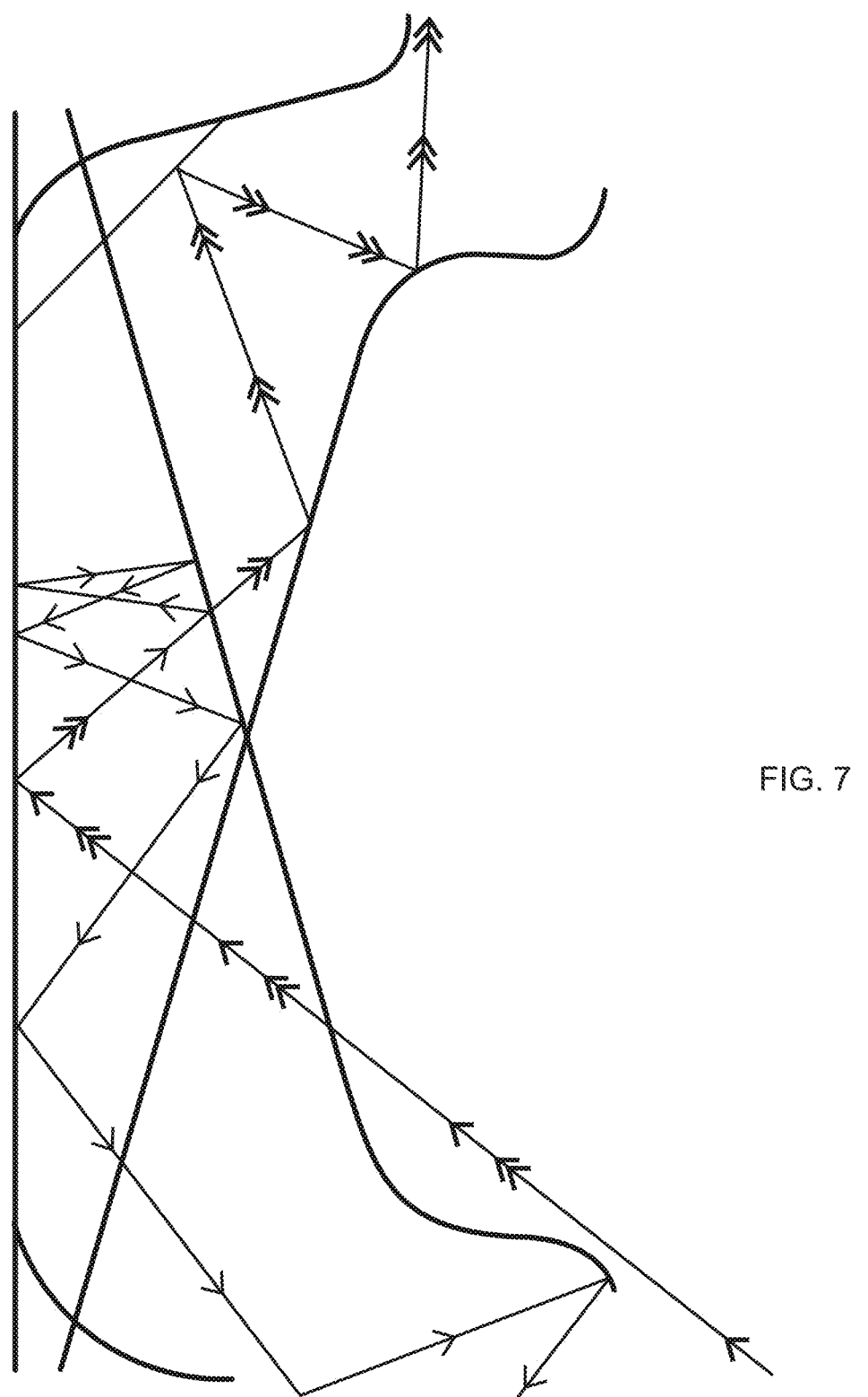
FIGS. 7 and 8 illustrate an embodiment with alternating collectors according to the invention with exits on opposite ends.
Figure 8:
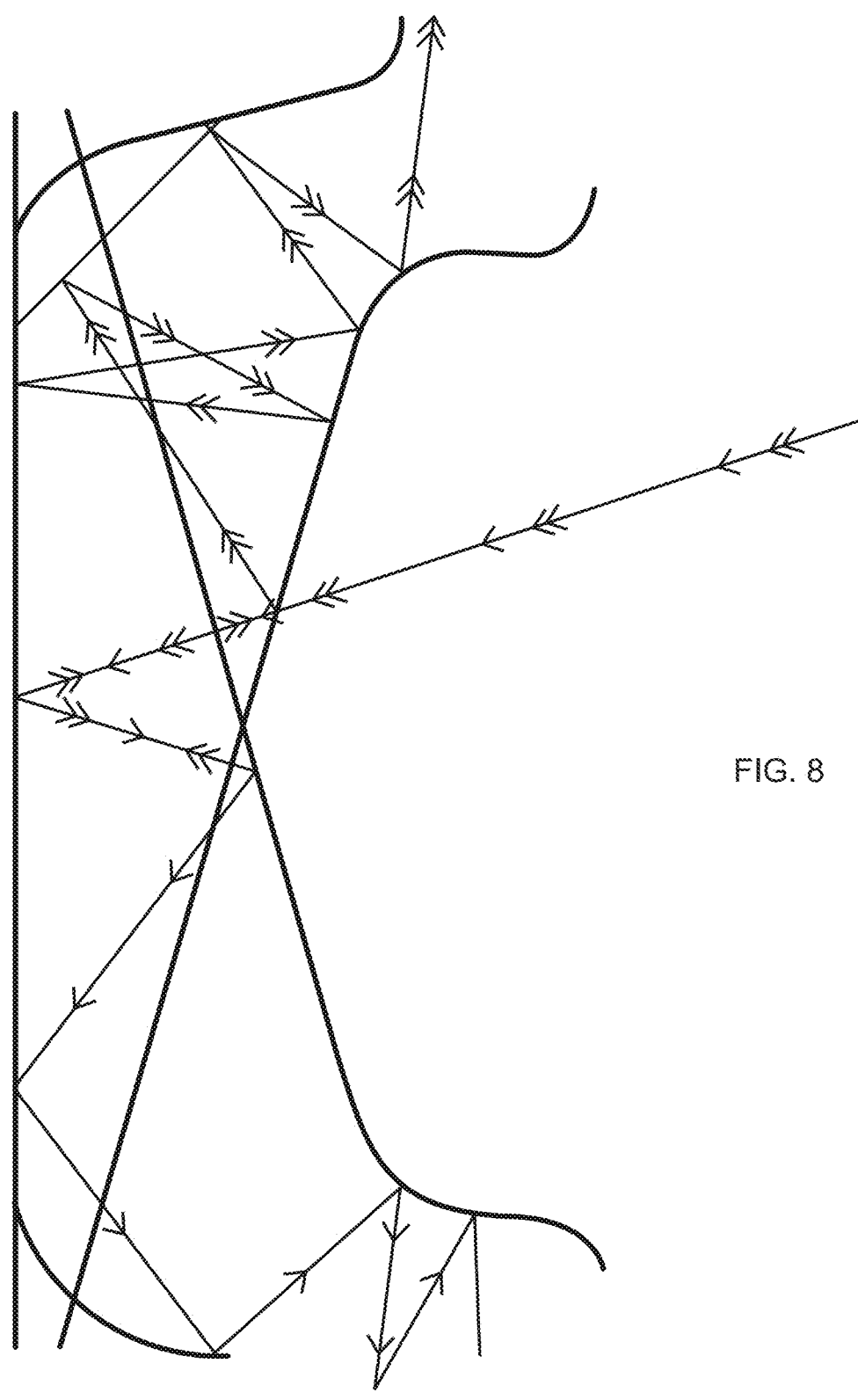

FIGS. 7 and 8 show an embodiment with alternating collectors according to the invention with exits on opposite ends. This is one manner in which to maximize total collection throughout the day.

Figure 9:
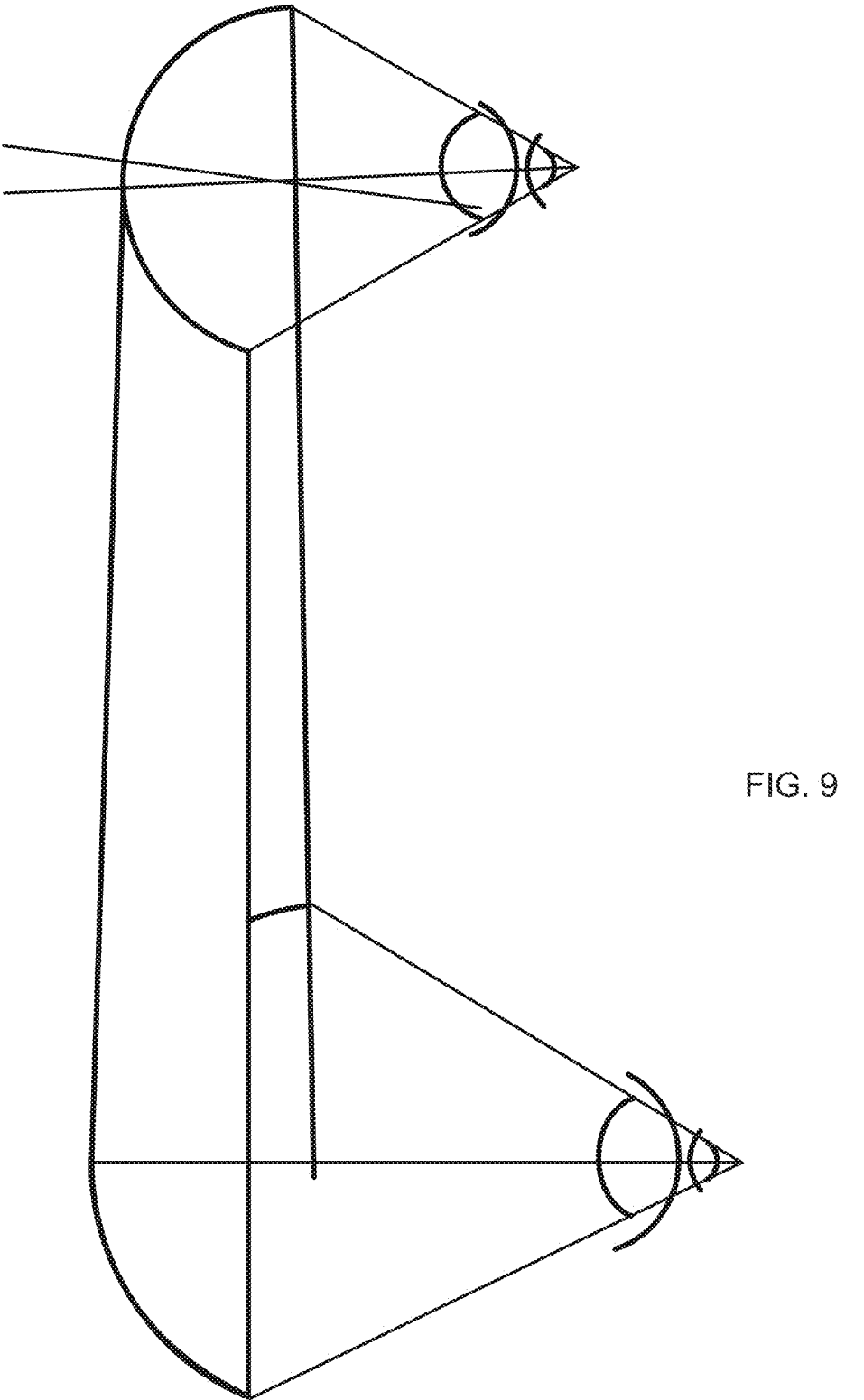
FIG. 9 illustrates an embodiment in which the first reflective surface varies in width to gradually increase focal length.

FIG. 9 illustrates an embodiment of the first reflective surface that varies in width, preferably gradually increasing at a steady rate from one end to the other, to increase focal length gradually.

The reflective surfaces are preferably silvered backed fused silica, but other materials, such as chromed/enameled/polished metal (e.g., formed and rolled), metalized polymer, and/or glass fused silica, may also be employed. The filtering surface is preferably sacrificial metalized polymer, but other materials, such as metal infused silica, may also be employed. The reflective surfaces are preferably paraboloid.

A third reflective surface may be located at the open end of the apparatus, preferably aligned to focus onto a converging point. Reflective surfaces can also be located along the edges of the first reflective surface in order to retain more reflected light within the device. For example, these can be combined in a unitary piece via a pattern of smaller reflective surfaces between those on the edges, with the second reflective surface at the center. Such an embodiment decreases maximum output at mid-day, but better retains incident light throughout the day.

The present invention, then, provides a heliostat requires no moving parts, has reflective surface areas that naturally concentrate collected visible light, and requires only a modicum of structural support.

Note that in the specification and claims, "about" or "approximately" means within ten percent (10%) of the numerical amount cited.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference.

What is claimed is:

1. A method for collecting radiation by reflecting, redirecting, focusing, and transitioning the radiation, the method comprising the steps of:

providing a first reflective focusing surface that varies in width, gradually increasing at a steady rate from one end to the other, to increase focal length gradually;

receiving full-spectrum light with the first surface;

focusing the light onto a second reflective focusing surface after passing through a filtering surface; and allowing the two reflective surfaces to reflect visible light from one surface to the other and out an exit, while infrared light is minimized via the filtering surface.

2. The method of claim 1 wherein in the allowing step the two reflective surfaces diverge from each other.

3. The method of claim 1 wherein the providing step comprises providing a paraboloid reflective surface.

4. An apparatus for collecting radiation by reflecting, redirecting, focusing, and transitioning the radiation, said apparatus comprising:

a first reflective focusing surface that varies in width, gradually increasing at a steady rate from one end to the other, to increase focal length gradually;

a second reflective focusing surface; and a filtering surface; and wherein said two reflective surfaces reflect visible light from one surface to the other and out an exit, while infrared light is minimized via the filtering surface.

5. The apparatus of claim 4 wherein said two reflective surfaces diverge from each other.

6. The apparatus of claim 4 wherein said first reflective surface is paraboloid.

* * * * *